United States Patent

Taguchi

[11] 3,946,408
[45] Mar. 23, 1976

[54] SHUTTER RELEASE DEVICE IN CAMERA
[75] Inventor: Tatsuya Taguchi, Tokyo, Japan
[73] Assignee: Canon Kabushiki Kaisha, Tokyo, Japan
[22] Filed: Oct. 10, 1974
[21] Appl. No.: 513,537

Related U.S. Application Data
[63] Continuation of Ser. No. 350,204, April 11, 1973.

[30] Foreign Application Priority Data
Apr. 28, 1972    Japan............................ 47-50360[U]

[52] U.S. Cl.................... 354/51; 354/50; 354/60 R; 354/266; 354/267
[51] Int. Cl.²...................... G03B 7/08; G03B 17/38
[58] Field of Search.............. 354/50, 51, 266, 60 R, 354/267

[56]           References Cited
              UNITED STATES PATENTS
3,603,228    9/1971    Kremp et al........................ 354/266
3,756,131    9/1973    Kuramoto et al..................... 354/51
3,831,180    8/1974    Tsujimoto........................... 354/51

Primary Examiner—L. T. Hix
Assistant Examiner—Russell E. Adams, Jr.
Attorney, Agent, or Firm—William R. Woodward

[57]           ABSTRACT

A separate annular actuator button surrounding the shutter release button and provided with its own mechanical stop is used to move the shutter release button just far enough to switch in the storage capacitor of a TTL light measuring system of a single-lens reflex camera. This annular button can conveniently and naturally be depressed in advance of direct manipulation of the shutter release button, assuring enough time for charging the capacitor rather than relying on the rate of direct manual depression of the shutter release button to interpose enough time between capacitor switch-in and shutter release. The capacitor charging which determines the timing of shutter closing is stopped by breaking the charging current before mirror movement or lens stop-down.

4 Claims, 6 Drawing Figures

SHUTTER RELEASE DEVICE IN CAMERA

This is a continuation, of application Ser. No. 350,204, filed Apr. 11, 1973.

BACKGROUND OF THE INVENTION

1. Field of the Invention

This invention relates to an actuator button system for initiating the picture-taking operation of a single-lens reflex (SLR) camera equipped with a through-the-lens (TTL) light metering system. More particularly, it relates to a compound shutter release actuator with an independently manipulable element for preliminarily depressing the shutter release button for a defined part of its travel for improved control of an electronic shutter controlling the exposure in response to the TTL metering system. The invention is particularly applicable to cameras with full aperture TTL metering systems.

2. Description of the Prior Art

In single-lens reflex cameras equipped for TTL metering and electronic shutter control, the metering element is sometimes positioned to receive light reflected from the viewfinder mirror, in which case the light beam travelling toward the metering element is cut off at the moment picture-taking starts, when the viewfinder mirror flips up out of the picture-taking optical path. Even if the viewfinder mirror is a fixed half-mirror, light metering is disturbed when the lens aperture is stopped down from its fully-open position to a preset value, as must be done before the shutter opens. The metering system alone thus cannot control an electronic shutter to provide a proper exposure and it is necessary to memorize the quantity of light from an object to be photographed measured by the metering system just prior to a picture-taking operation. Some known cameras utilize a capacitor for electrical memorization of the light valve, while other employ mechanical memorizing means. In all of them, the memory means is actuated in response to depression of the shutter release button and prior to the actuation of the movable viewfinder mirror and of the lens aperture means. In other words, the rate of depression of shutter button is relied on to provide an adequate time interval between the successive actuations of the memorizing and shutter release operations at different stages of the travel path of the shutter button. Since an interval of several tens to several hundreds of milliseconds is usually required for completion of the memorization operation, however, an unusually rapid depression of the shutter release button may result in an insufficient memorizing time and hence also an improper exposure.

SUMMARY OF THE INVENTION

The present invention has for its object the avoidance of the drawbacks described above.

Briefly, a memory button or ring having its own mechanical stop is provided in addition to a shutter button and adjacent thereto so as to be manipulable by the same finger. The depression of the memory button to its stop depresses the shutter button and its release bar far enough to operate a switch to complete the memorizing circuit, but not far enough to release the shutter. By operating the shutter button directly only after the memory button has been felt by the operator's finger to be fully depressed, the operator of the camera can be sure that light value memorization has been completed before shutter release. The memorization process is therefore completed before it is interrupted by a switch actuated by one of the mechanical movements connected with shutter release, such as mirror flip-up, after which the memorized light value controls the exposure.

The invention will be described more fully with respect to some specific embodiments as shown in the accompanying drawings.

DESCRIPTION OF THE PREFERRED EMBODIMENTS

Figure 1:
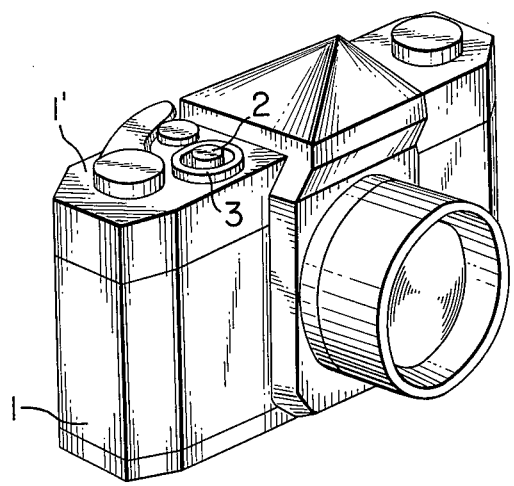
FIG. 1 is a pictorial, perspective view of a camera having the shutter release device according to the present invention.
Figure 2:
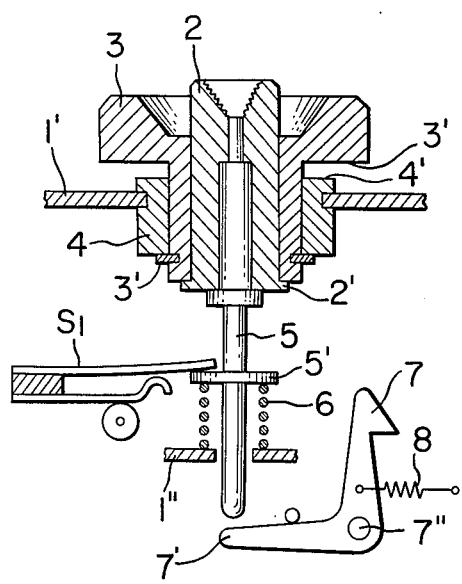
FIG. 2 is a cross-sectional view of a compound shutter release device according to the present invention.
Figure 6:
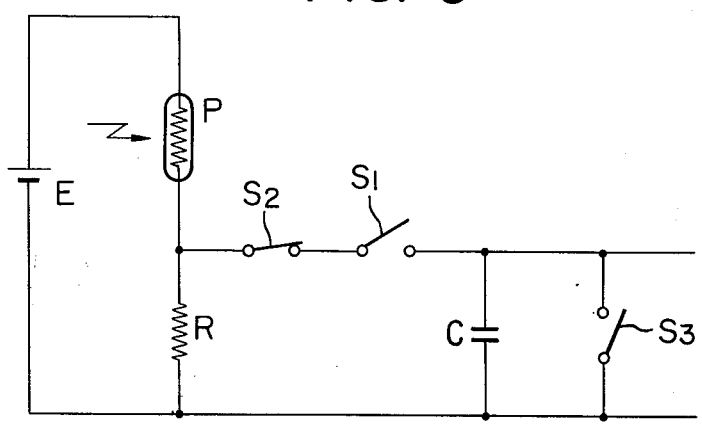
FIG. 6 diagrammatically illustrates a memory circuit for the electronic shutter.

As shown in FIG. 1, a shutter release button 2 is provided on top of a camera body 1 and a ring-shaped operating button 3 for memorizing the light value is provided concentrically with the button 2. The button 3 is slidably supported for its vertical sliding over a predetermined stroke in a bearing 4 secured to an upper camera cover 1', as shown in FIG. 2. The shutter release button 2 is slidably supported within the memory button 3 and biased upwardly by a spring 6 wound around a release bar 5 between the flange 5' thereof and a fixed portion 1'' of the camera, and is stopped by the flange 2' of the shutter release button 2 abutting against the button 3 to cause the stop portion 3' of the latter button to bear against the lower face of the bearing 4. Reference numeral 7 designates a release lever which is normally biased by a spring 8 to retain actuator member (not shown). When one end 7' of the release lever 7 is actuated by the release bar 5, the lever 7 swings counter-clockwise about a pivot 7'' to release its retention of the unshown actuator member, thereby permitting a sequence of operations such as flip-up of the viewfinder mirro, actuation of an aperture stop-down means, shutter release, etc. mirror, $S_1$ denotes a switch in the memory circuit of an electronic shutter as shown in FIG. 6. The switch $S_1$ is normally open with one contact thereof engaged and urged upwardly by the flange 5' of the release bar 5, and may be closed from its own resiliency with depression of the shutter release button 2.

In FIG. 6, $S_2$ is a switch normally closed and adapted to open when the movable viewfinder mirror flips up. E denotes a power source, P a photoconductive light receiving element, R a resistor, C a storage capacitor, and $S_3$ a discharging switch.

Operation of the device according to the present invention will now be described.

Figure 3:
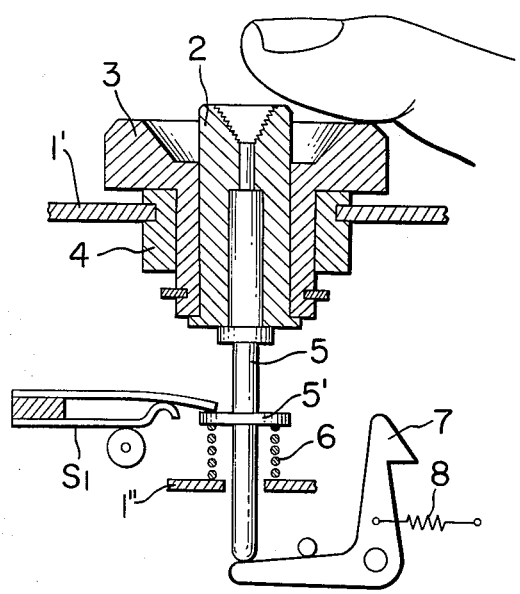
FIG. 3 is a cross-sectional view of the same device in a position where only the light value button has been actuated.

The camera is set in preparation for picture-taking, and then the user positions his a finger above the shutter release button 2 as shown in FIG. 3. The finger contacts the memory button 3 first of all, without contacting the shutter release button 2. As the finger is lowered, it depresses the memory button 3 and the shutter release button 2 engaged therewith by the abutment of the flange 2', thus depressing the release bar 5, against the force of the spring 6, so that the switch $S_1$ which has so far been kept open by the flange 5' of the release bar 5 is now closed. This causes the capacitor C in the memory circuit to be charged by the battery E with a charge, determined by the resistance and the resistance of the photoconductive element P, corresponding to the brightness of the object to be photographed. The storing of this charge memorizes the light value.

The memory button 3 is stopped with its lower face 3' bearing against the upper face 4' of the bearing 4. In this position, the release bar 5 is still inoperative to rotate the release lever 7 and accordingly inoperative to effect a shutter release operation.

Figure 4:
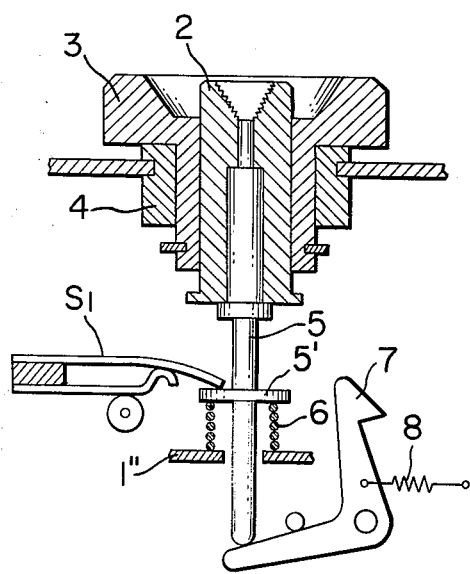
FIG. 4 is a cross-sectional view of the same device in a position where the shutter release button has been fully depressed after the light value has been memorized.

When the finger is pivoted about the memory button 3 to depress the shutter release button 2 directly, the release bar 5 now actuates the one end 7' of the release lever 7 for counter-clockwise rotation as viewed in FIG. 4, thereby actuating the movable mirror, the aperture stop-down means and the shutter in succession.

Since the switch $S_2$ is opened in response to the flip-up of the movable mirror as described above, the voltage in the capacitor is maintained and, subsequently, a time constant circuit of known form (not shown) is triggered in response to the shutter release so that the electronic shutter is operated to close after the correct exposure interval by a circuit (not shown) responsive to the discharge of the storage capacitor C.

In the above-described embodiment, it may be seen that the switch in the memory circuit may be actuated in response to indirect depression of the shutter release button by the movable memory button surrounding the shutter button by a finger movement prior to the direct depression of the shutter button, thus assuring a sufficient time interval between the memorizing operation and the shutter release.

Figure 5:
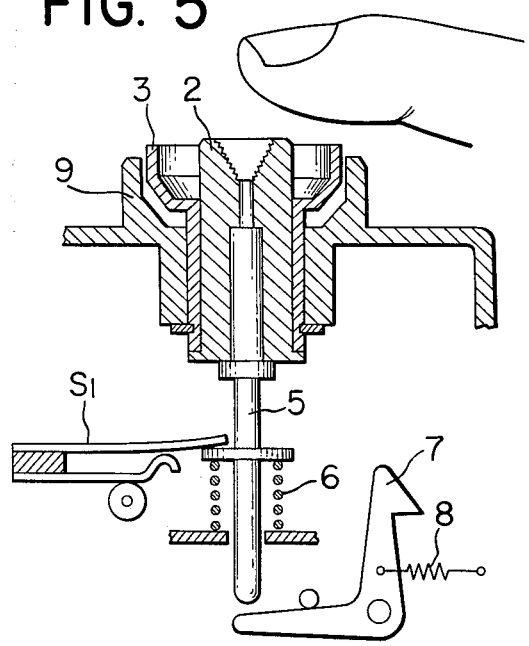
FIG. 5 shows, in cross-section, a modified embodiment of the present invention.

FIG. 5 shows a modification of the present invention in which a pedestal 9 is additionally provided to protectively surround the memory button 3. This embodiment is easier to manipulate.

In the described embodiments, the memory means has been shown as an electrical system alone, but if a mechanical memory system is adopted, the switch $S_1$ may be replaced by an actuator for the memory means operatively associated with the release bar 5.

I claim:

1. In a single-lens reflex camera equipped with a through-the-picture-taking-lens light metering system and an electronic exposure control system responsive to the output of said metering system said metering system having a memorizing means and a light measuring device a shutter release device comprising:
   a shutter release member which is spring-biased towards a rest position thereof and capable of being manually depressed to an end position;
   a shutter release mechanism which is so disposed as to be tripped, only when said shutter release member is in the immediate vicinity of its said end position;
   switch means for transmitting an output from said light measurement device to said memorizing means by being closed in interconnection with depression of the shutter release member from the rest position thereof to an intermediate position;
   an auxiliary member, provided around said shutter release member, for causing said shutter release member to shift to said intermediate position by the depression of said auxiliary member with a finger; and
   a stopping member for causing said auxiliary member to stop at a fixed position and for requiring a pivoting or shift of finger action thereafter for further depression of said shutter release member towards its said end position.

2. A shutter release device as defined in claim 1 in which said auxiliary means is of annular form disposed coaxially with respect to said shutter release member.

3. A shutter release device as defined in claim 2 further comprising a guard ring provided externally of and coaxial with said auxiliary means.

4. In a single-lens reflex camera equipped with a through-the-picture-taking-lens light metering system and an electronic exposure control system responsive to the output of said metering system said metering system having a memorizing means and a light measuring device, said camera having a viewing mirror movable out of the photographic optical path of said camera in a preliminary stage of a shutter release operation, a shutter release device comprising:
   a shutter release member which is springed biased towards a rest position thereof and capable of being manually depressed to an end position;
   a shutter release mechanism disposed so as to be tripped only when said shutter release member is in the immediate vicinity of its said end position, said shutter release mechanism including means for causing said viewing mirror to be moved out of said photographic optical path;
   first switching means for connecting the output of said light measuring device to said memorizing means in response to a depression of said shutter release member to an intermediate position thereof between its rest and end positions;
   auxiliary means for a limited depression of said shutter release member to its said intermediate position and short of the vicinity of its said end position, said auxiliary means including a manually operable member adjacent said shutter release member shaped for downward abutment on said shutter release member and stop means for arresting said manually operable member against further downward movement substantially beyond that movement necessary for operation of said first switching means by said shutter release member and for thereby requiring a modification of manual operation for further depression of said shutter release member towards its said end position, and
   second switching means responsive to movement of said shutter release mechanism upon tripping of said mechanism for thereupon disconnecting said memorizing means from said light measuring device.

* * * * *